United States Patent
Ahmad et al.

(10) Patent No.: US 10,233,767 B2
(45) Date of Patent: Mar. 19, 2019

(54) TURBINE BLADE OR VANE HAVING A STEPPED AND BEVELED PLATFORM EDGE

(71) Applicant: SIEMENS AKTIENGESELLSCHAFT, München (DE)

(72) Inventors: Fathi Ahmad, Kaarst (DE); Nihal Kurt, Düsseldorf (DE); Ralf Müsgen, Essen (DE); Eckart Schumann, Berlin (DE)

(73) Assignee: Siemens Aktiengesellschaft (DE)

( * ) Notice: Subject to any disclaimer, the term of this patent is extended or adjusted under 35 U.S.C. 154(b) by 194 days.

(21) Appl. No.: 14/900,225

(22) PCT Filed: Jun. 10, 2014

(86) PCT No.: PCT/EP2014/061996
§ 371 (c)(1),
(2) Date: Dec. 21, 2015

(87) PCT Pub. No.: WO2014/206717
PCT Pub. Date: Dec. 31, 2014

(65) Prior Publication Data
US 2016/0146031 A1     May 26, 2016

(30) Foreign Application Priority Data
Jun. 26, 2013 (EP) .................................. 13173717

(51) Int. Cl.
*F01D 11/00*     (2006.01)
*B23H 1/00*     (2006.01)
(Continued)

(52) U.S. Cl.
CPC .............. *F01D 11/008* (2013.01); *B23H 1/00* (2013.01); *F01D 5/147* (2013.01); *F01D 9/041* (2013.01);
(Continued)

(58) Field of Classification Search
CPC ...... F01D 11/008; F01D 11/005; F01D 9/041; F01D 9/042; F05D 2250/192; B23H 1/00
See application file for complete search history.

(56) References Cited

U.S. PATENT DOCUMENTS 2,405,146 A    8/1946   Huber
3,014,695 A    12/1961   Rankin et al.
(Continued)

FOREIGN PATENT DOCUMENTS

CN     101405478 A     4/2009
CN     101775999 A     7/2010
(Continued)

OTHER PUBLICATIONS

Translation of Japanese Office Action Application No. 2016-522371, dated Dec. 5, 2016.
(Continued)

*Primary Examiner* — Jason Shanske
*Assistant Examiner* — Maxime Adjagbe
(74) *Attorney, Agent, or Firm* — Schmeiser, Olsen & Watts LLP.

(57) ABSTRACT

A turbine blade, including: an airfoil and a platform, which has an upper face on which the airfoil is arranged; and at least one lateral face, the lateral face including a slot for insertion of a sealing strip. The transition between the upper face of the platform and the at least one lateral face includes a stepped portion and a beveled portion is provided.

11 Claims, 2 Drawing Sheets

(51) Int. Cl.
*F01D 5/14* (2006.01)
*F01D 9/04* (2006.01)

(52) U.S. Cl.
CPC ............ *F01D 9/042* (2013.01); *F01D 11/005* (2013.01); *F05D 2220/31* (2013.01); *F05D 2220/32* (2013.01); *F05D 2230/12* (2013.01); *F05D 2240/11* (2013.01); *F05D 2240/12* (2013.01); *F05D 2240/30* (2013.01); *F05D 2240/55* (2013.01); *F05D 2250/192* (2013.01)

(56) References Cited

U.S. PATENT DOCUMENTS

| | | | |
|---|---|---|---|
| 3,801,221 | A | 4/1974 | Zlotek |
| 4,714,410 | A | 12/1987 | Hancock |
| 4,767,260 | A * | 8/1988 | Clevenger ............... F01D 9/041 415/115 |
| 4,878,811 | A | 11/1989 | Jorgensen |
| 6,910,854 | B2 * | 6/2005 | Joslin ...................... F01D 5/225 415/139 |
| 7,217,081 | B2 | 5/2007 | Scheurlen et al. |
| 2004/0200807 | A1 * | 10/2004 | Forrester ................. B23H 7/26 219/69.17 |
| 2006/0083620 | A1 | 4/2006 | Scheurlen |
| 2006/0120864 | A1 | 6/2006 | Lu et al. |
| 2013/0052020 | A1 | 2/2013 | Noble |

FOREIGN PATENT DOCUMENTS

| | | |
|---|---|---|
| EP | 0902167 A1 | 3/1999 |
| EP | 1408199 A1 | 4/2004 |
| EP | 1956196 A2 | 8/2008 |
| EP | 2649279 A1 | 10/2013 |
| JP | S5031409 A | 3/1975 |
| JP | S578103 A | 6/1980 |
| JP | S6350605 A | 3/1988 |
| JP | H024761 A | 1/1990 |
| JP | 2003129803 A | 5/2003 |
| JP | 2004132372 A | 4/2004 |
| JP | 2006161810 A | 6/2006 |
| JP | 2012225242 A | 11/2012 |

OTHER PUBLICATIONS

International Search Report for Application No. PCT/EP2014/061996, dated Sep. 18, 2014.
English translation of Chinese Office Action for CN Application No. 2016-522371, dated Jul. 31, 2017.

* cited by examiner ved by recesses, such that the
transition between the top platform surface and the lateral
TURBINE BLADE OR VANE HAVING A STEPPED AND BEVELED PLATFORM EDGE

CROSS-REFERENCE TO RELATED APPLICATIONS

This application claims priority to PCT Application No. PCT/EP2014/061996, having a filing date of Jun. 10, 2014, based off of European Application No. 13173717.3 having a filing date of Jun. 26, 2013, the entire contents of which are hereby incorporated by reference.

FIELD OF TECHNOLOGY

The following relates to a turbine blade or vane, for example a guide vane or a rotor blade of a gas turbine or of a steam turbine. Embodiments of the invention furthermore relate to a method for producing such a turbine blade or vane and a turbine.

BACKGROUND

Turbine blades or vanes of gas turbines or steam turbines are typically exposed to severe mechanical, chemical and thermal loading. For this reason, the surfaces of the respective airfoil and the surfaces of the blade or vane platforms, which are likewise exposed to said loading, are provided with suitable coatings. A coating system of this type comprises, for example, what is termed a bond coat and a thermal barrier coating (TBC).

The airfoil of a turbine blade or vane is generally arranged on what is termed a platform. The platform and the blade or vane root arranged therebeneath serve to arrange and to fasten the turbine blade or vane on a mount component, for example a rotor disk or a ring or blade or vane ring. In this context, it is undesirable for coating material resulting from the coating of the airfoil and the surface of the platform to protrude beyond the edge of the platform and to be located in particular on the lateral face of the platform. Corresponding contamination of the lateral faces of the platform would make it more difficult to precisely arrange the turbine blade or vane on the mount component, for example on the rotor disk or on a ring, and could moreover lead to undesirable mechanical effects or leakage flows.

The airfoil and the surface of the platform are preferably coated by spraying on the coating material. Possible overspraying of the platform edges of turbine blades or vanes, for example guide vanes or rotor blades, is not acceptable, and therefore, for the aforementioned reasons, coating material which has passed beyond the platform edge has to be removed manually, for example has to be abraded. This results in increased costs, an additional loss of time during the production process and, under certain circumstances, undesirable deviations in the dimensioning of the respective turbine blade or vane.

In order to avoid the above-described post-machining of the platforms, the marginal edges of the top surface of the platform are partly set back by recesses, such that the transition between the top platform surface and the lateral face of the platform has a stepped configuration. A step or recess of this type usually has a height of 4 mm.

A slot for a sealing strip is generally arranged on the lateral face of the platform. The slot comprises a top and a bottom edge. Since the platform of rotor blades or guide vanes becomes thinner in the direction of the generator connected to the turbine, or in the main direction of flow, this being due to the contour of the hot gas flow duct, there is the risk that the top edge becomes continuously thinner, and under certain circumstances will disappear, owing to the above-described step or recess. The top edge of the sealing slot is required, however, in order to prevent coating material from being sprayed into the slot itself.

SUMMARY

Against this background, the aspect relates to providing an advantageous turbine blade or vane. The aspect relates to an advantageous turbine. A further aspect provides an advantageous method for producing a turbine blade or vane.

The turbine blade or vane according to embodiments of the invention comprise an airfoil and a platform. The platform comprises a top surface, on which the airfoil is arranged. The platform furthermore comprises at least one lateral face. The lateral face comprises a slot for insertion or reception of a sealing strip. The transition between the top surface of the platform and the lateral face comprises a stepped region and a beveled region.

During the production of the turbine blade or vane, the edge which is initially present in the blank for the platform between the top surface of the platform and the lateral face has thus been configured, in a first region, in the form of a step or notch or in the form of a setback or a recess. In a second region, the original edge has been configured in the form of a bevel or fold or chamfer.

The stepped region and the beveled region are preferably arranged in succession in a longitudinal direction of the turbine blade or vane. The turbine blade or vane can comprise a front side and a rear side. In this case, the front side is the side on which the leading edge of the airfoil is arranged on the platform, and the rear side is the side on which the trailing edge of the airfoil is arranged. Considered in the direction from the front side to the rear side of the turbine blade or vane, the stepped region is preferably arranged upstream of the beveled region.

The turbine blade or vane according to embodiments of the invention has the advantage that the disadvantages arising in conjunction with a continuously stepped configuration of the edge of the platform are avoided. In particular, the upper edge of the sealing slot is retained and, in particular, does not lose its stability.

The turbine blade or vane according to embodiments of the invention are advantageously a rotor blade or a guide vane, for example a rotor blade or a guide vane of a gas turbine or of a steam turbine.

The platform can comprise, for example, two lateral faces, a front side and a rear side. In this case, the stepped region is arranged between the front side and the beveled region, and the beveled region is arranged between the stepped region and the rear side. In this respect, "between" means in a direction parallel to the respective side edge or parallel to the longitudinal direction of the respective lateral face. It is preferable for both lateral faces of the platform, as described, to be configured with a stepped region and a beveled region.

In addition, the platform can comprise a transition region, which is arranged between the stepped region and the beveled region and in which the stepped region merges into the beveled region. It is preferable that the stepped region merges continuously into the beveled region in the transition region. Continuous merging of the stepped region into the bevelled region has the advantage that the turbine blade or vane is easy to mount and undesirable tilting in the mount, for example in the rotor disk, is avoided.

The stepped region preferably has a step having a height of between 2 mm and 6 mm, for example between 3.5 mm and 4.5 mm, preferably 4 mm. The step can moreover have a depth of between 0.4 mm and 8 mm, for example between 0.5 mm and 7 mm, preferably 6 mm.

The beveled region is advantageously arranged between the rear side of the platform and the airfoil in a longitudinal direction running parallel to the lateral face. That is to say that, in a projection of the position of the airfoil on an axis running along the lateral face, the beveled region is arranged on this axis between the rear side of the platform and the airfoil, in particular the trailing edge of the airfoil. This has the advantage that the region of the platform in which the thickness of the platform is at its smallest is designed with a beveled edge. As a result, the function and stability of the slot for the sealing strip are retained.

It is advantageous that the height or thickness of the platform decreases from the trailing edge of the airfoil toward the rear side of the platform. It is preferable that the thickness or height of the platform at the beveled region decreases toward the rear side of the platform. The decrease is advantageously continuous.

The turbine blade or vane according to embodiments of the invention have the advantage that reworking required under certain circumstances following the coating is reduced or is avoided. At the same time, the deviations in the geometry or dimensioning of the platform which are caused as a result of the additional machining of the platform arising from overspraying of coating material are reduced or avoided completely. In addition, the turbine blade or vane according to embodiments of the invention is easy to service. It causes fewer difficulties in relation to erosion and corrosion during refurbishment. In principle, the combination of a beveled region with a stepped region can be used both for guide vanes and for rotor blades.

The turbine according to embodiments of the invention comprise an above-described turbine blade or vane. It fundamentally has the same advantages as the above-described turbine blade or vane. The turbine according to embodiments of the invention can be a gas turbine or a steam turbine, for example.

The method according to embodiments of the invention for producing an above-described turbine blade or vane according to embodiments of the invention is distinguished by the fact that the stepped region and/or the beveled region and/or the transition region between the stepped region and the beveled region is removed from the platform by electrical discharge machining (EDM). The method according to embodiments of the invention has the advantage that the geometry of the platform which is characteristic of the turbine blade or vane according to embodiments of the invention can be generated in a simple manner.

The geometry of the stepped region and/or of the beveled region which is characteristic of the turbine blade or vane according to embodiments of the invention can preferably be implemented in an electrode, for example graphite electrode, used during the production of the turbine blade or vane. In principle, it is possible, for example, for the stepped region and/or the beveled region and/or the transition region to likewise be worked out of the platform blank in conjunction with the working out of the slot for the sealing strip. This is the case in particular for guide vanes.

Furthermore, the electrode used can be produced by milling, for example. Particularly in the case of rotor blades, it is expedient to produce the electrode to be used by 5 axis milling.

BRIEF DESCRIPTION OF THE DRAWINGS

Some of the embodiments will be described in detail, with reference to the following figures, wherein like designations denote like members, wherein.

DETAILED DESCRIPTION

Figure 1:
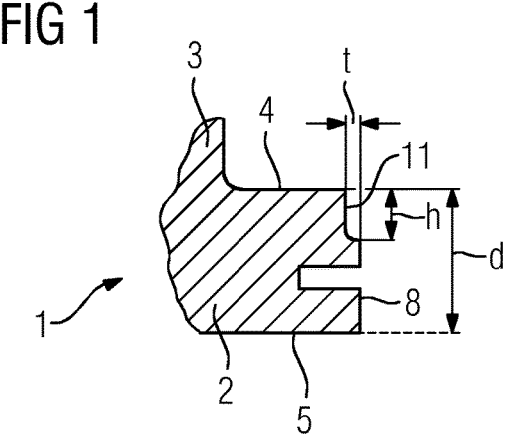
FIG. 1 schematically shows a section through part of a turbine blade or vane.

FIG. 1 schematically shows a section through part of a turbine blade or vane 1. The turbine blade or vane 1 shown in FIG. 1 can be, for example, a guide vane 117 or a rotor blade 115. FIG. 1 schematically shows part of the platform 2 and part of airfoil 3. The platform 2 comprises a top surface 4, a bottom surface 5, a front side 6, a rear side 7 and two lateral faces 8. The airfoil 3 is arranged on the top side 4 or on the top surface of the platform 2. A blade or vane root 9 adjoins the bottom surface 5 or bottom side of the platform 2.

The lateral face 8 comprises a slot 10 for insertion of a sealing strip. The sealing strip serves to seal off the intermediate space between two adjacent turbine blades or vanes 1.

Both the airfoil 3 and the top surface 4 of the platform 2 are coated with a bond coat and a thermal barrier layer. This is typically done by spraying on the coating material. In order to prevent overspraying of the coating material from the top surface onto the lateral face, the transition from the top surface 4 to the lateral face 8 is configured in the form of a step 11. This has the effect that overspraying of the stepped region 11 is harmless and in particular does not make post-machining of the platform 2 necessary. Moreover, the region of the lateral face 8 beneath the step 11 or recess or notch is effectively protected against undesirable spraying with coating material.

The step 11 has a height h of 4.0±0.5 mm and a depth t of 0.6±0.1 mm.

Figure 2:
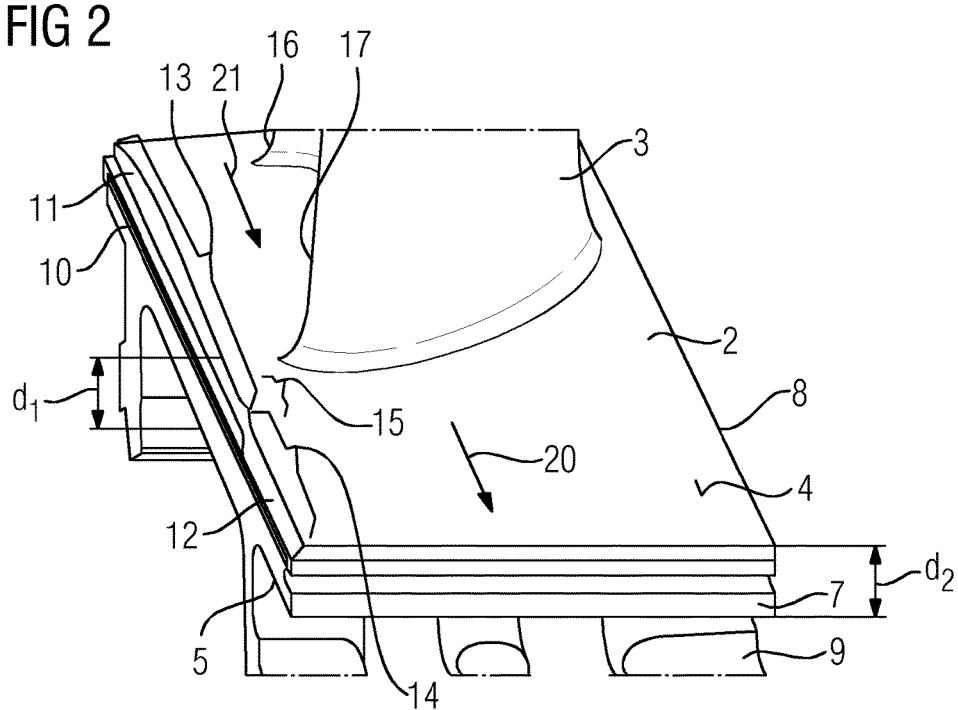
FIG. 2 schematically shows a partial region of a guide vane in a perspective view.
Figure 3:
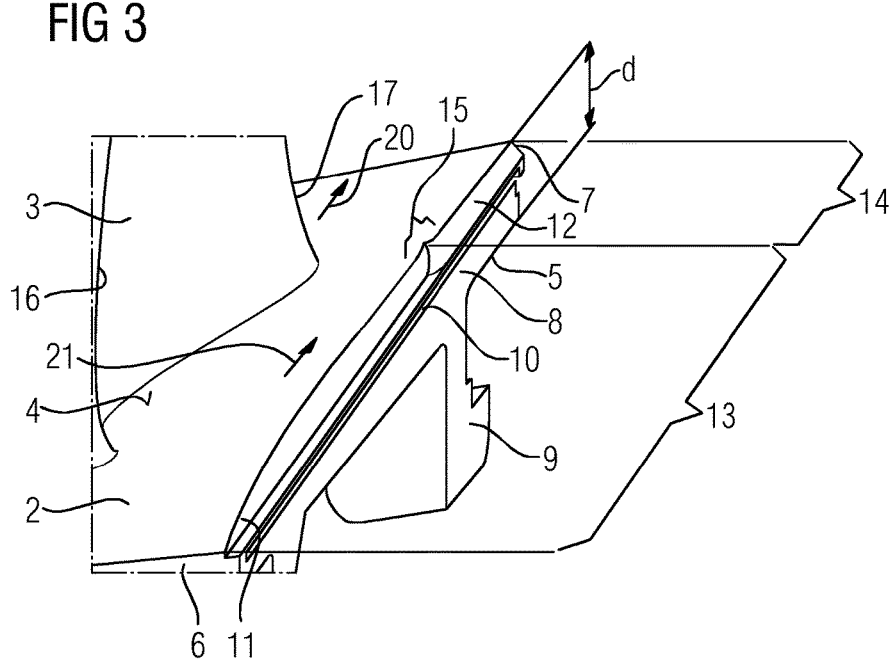
FIG. 3 schematically shows a partial region of a guide vane in a perspective view and FIG. 4 schematically shows a gas turbine.

FIGS. 2 and 3 schematically show a partial region of a guide vane 117 in a perspective view. The guide vane 117 comprises an airfoil 3, a platform 2 and a vane root 9. The airfoil 3 is arranged on the platform 2. It comprises a leading edge 16 and a trailing edge 17. The platform 2 comprises two lateral faces 8. A slot 10 for insertion of a sealing ring is arranged on each lateral face 8.

In the main direction of flow 20 of the hot gas, or in a longitudinal direction 21 running parallel to one of the lateral faces 8, the thickness or height d of the platform 2 decreases, preferably continuously, at least from the trailing edge 17 of the airfoil 3 toward the rear side 7 of the platform 2. In FIG. 2, for example, the thickness or height $d_1$ of the platform 2 downstream of the trailing edge 17 is greater than the thickness or height $d_2$ of the platform 2 on the rear side 7.

A stepped region 13 and, adjoining the latter, a beveled region 14 are arranged between the front side 6 of the platform 2 and the rear side 7 of the platform 2, along the lateral face 8 above the slot 10 for the sealing ring. The stepped region 13 starts at the front side 6 of the platform 2, and extends as far as downstream of the trailing edge 17 of the airfoil 3, in relation to the longitudinal direction 21. The beveled region 14 extends from the stepped region 13 as far as the rear side 7 of the platform 2.

There is a transition region 15 between the stepped region 13 and the beveled region 14. In the transition region 15, the geometry of the stepped region 13 merges continuously into the geometry of the beveled region 14.

The stepped region 13 preferably has a step 11 having a height of between 2 mm and 6 mm, for example 3.5 mm to 4.5 mm, preferably 4 mm. The step 11 preferably has a depth t of between 0.4 mm and 0.8 mm, for example between 0.5 mm and 0.7 mm, preferably 0.6 mm.

Figure 4:
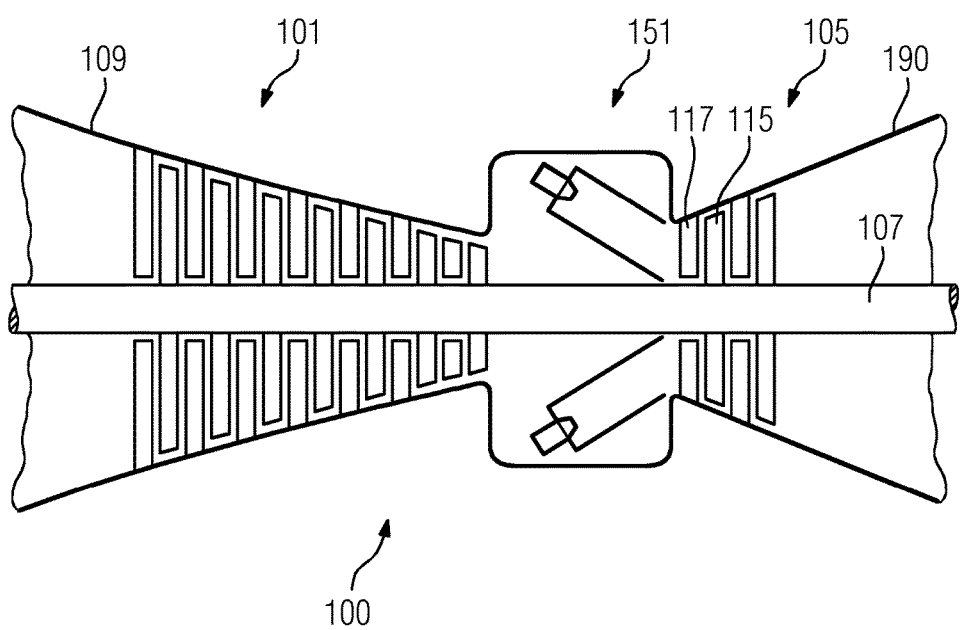

FIG. 4 schematically shows a gas turbine. In the interior, a gas turbine has a rotor with a shaft 107 which is mounted such that it can rotate about an axis of rotation and is also referred to as the turbine rotor. An intake housing 109, a compressor 101, a burner arrangement 15, a turbine 105 and the exhaust gas housing 190 follow one another along the rotor.

The burner arrangement 15 is in communication with a for example annular hot gas duct. There, multiple series-connected turbine stages form the turbine 105. Each turbine stage is formed from blade or vane rings. As seen in the direction of flow of a working medium, in the hot gas duct a row of guide vanes 117 is followed by a row formed from rotor blades 115.

In that context, the guide vanes 117 are secured to an inner housing of a stator, whereas the rotor blades 115 of a row are fitted to the rotor for example by means of a turbine disk. A generator is coupled to the rotor.

While the gas turbine is in operation, the compressor 101 sucks in air through the intake housing 109 and compresses it. The compressed air provided at the turbine-side end of the compressor 101 is passed to the burner arrangements 15, where it is mixed with a fuel. The mix is then burnt in the combustion chamber, forming the working medium. From there, the working medium flows along the hot gas duct past the guide vanes 117 and the rotor blades 115. The working medium is expanded at the rotor blades 115, transferring its momentum, so that the rotor blades 115 drive the rotor and the latter in turn drives the generator coupled to it.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A turbine blade or vane, which comprises an airfoil, a platform, which has a top surface on which the airfoil is arranged, and at least one lateral face located below the top surface, the at least one lateral face comprising a slot for insertion of a sealing strip, the slot extending along the at least one lateral face, wherein the transition between the top surface of the platform and the at least one lateral face comprises a stepped region and a beveled region.

2. The turbine blade or vane as claimed in claim 1, wherein the turbine blade or vane is a rotor blade or a guide vane.

3. The turbine blade or vane as claimed in claim 1, wherein the at least one lateral face is two lateral surfaces two lateral faces, a front side and a rear side, the stepped region being arranged between the front side and the beveled region, and the beveled region being arranged between the stepped region and the rear side.

4. The turbine blade or vane as claimed in claim 1, wherein the platform comprises a transition region, which is arranged between the stepped region and the beveled region and in which the stepped region merges into the beveled region.

5. The turbine blade or vane as claimed in claim 1, wherein the stepped region comprises a step having a height of between 2 mm and 6 mm and/or a depth of between 0.4 mm and 0.8 mm.

6. The turbine blade or vane as claimed in claim 1, wherein the beveled region is arranged between the rear side of the platform and the airfoil in a longitudinal direction running parallel to the lateral face.

7. The turbine blade or vane as claimed in claim 1, wherein the height of the platform decreases toward the rear side of the platform.

8. A turbine, comprising a turbine blade or vane as claimed in claim 1.

9. The turbine as claimed in claim 8, wherein
the turbine is a gas turbine or a steam turbine.

10. A method for producing a turbine blade or vane as claimed in claim 4, wherein the stepped region and/or the beveled region and/or the transition region between the stepped region and the beveled region is formed in the platform by electrical discharge machining.

11. The method as claimed in claim 10, wherein the stepped region and/or the beveled region and/or the transition region between the stepped region and the beveled region is worked out as the slot for the sealing strip is being worked out.

* * * * *